United States Patent
Gigan et al.

(10) Patent No.: US 12,038,569 B2
(45) Date of Patent: Jul. 16, 2024

(54) HIGH SENSITIVITY PHASE MICROSCOPY IMAGING

(71) Applicants: Sorbonne Université, Paris (FR); Centre National de la Recherche Scientifique, Paris (FR); École Normale Supérieure de Paris, Paris (FR)

(72) Inventors: Sylvain Gigan, Paris (FR); Thomas Juffmann, Vienna (AT); Andrés De Los Ríos Sommer, Tlalpan (MX)

(73) Assignees: CENTRE NATIONAL DE LA RECHERCHE SCIENTIFIQUE, Paris (FR); ÉCOLE NORMALE SUPÉRIEURE DE PARIS, Paris (FR); SORBONNE UNIVERSITÉ, Paris (FR)

( * ) Notice: Subject to any disclaimer, the term of this patent is extended or adjusted under 35 U.S.C. 154(b) by 699 days.

(21) Appl. No.: 17/273,255

(22) PCT Filed: Sep. 4, 2019

(86) PCT No.: PCT/EP2019/073576
§ 371 (c)(1),
(2) Date: Mar. 3, 2021

(87) PCT Pub. No.: WO2020/049041
PCT Pub. Date: Mar. 12, 2020

(65) Prior Publication Data
US 2021/0325653 A1    Oct. 21, 2021

(30) Foreign Application Priority Data
Sep. 5, 2018  (EP) .................................. 18306171

(51) Int. Cl.
G02B 21/14    (2006.01)
G02B 21/36    (2006.01)

(52) U.S. Cl.
CPC .......... *G02B 21/14* (2013.01); *G02B 21/365* (2013.01)

(58) Field of Classification Search
None
See application file for complete search history.

(56) References Cited

U.S. PATENT DOCUMENTS 6,369,932 B1 * 4/2002 Gerchberg ............. G02B 27/46
359/279
2003/0030902 A1    2/2003 Fukushima et al.
(Continued)

FOREIGN PATENT DOCUMENTS

WO    2020049041 A1    9/2019

OTHER PUBLICATIONS

Foreign Communication from a Related Counterpart Application, International Search Report and Written Opinion dated Dec. 4, 2019, International Application No. PCT/EP2019/073576 filed on Sep. 4, 2019.
(Continued)

*Primary Examiner* — Derek S. Chapel
(74) *Attorney, Agent, or Firm* — Maier & Maier, PLLC

(57) ABSTRACT

A device for phase microscopy is disclosed that comprises a spatial light modulator and a connecting means adapted to fix the spatial light modulator onto a phase microscope. The phase microscope comprises a light path comprising at least a sample area, a light device for lighting said sample area, and an imaging device for capturing a phase image of said sample area. The phase image is a 2D matrix of pixels. The spatial light modulator is positioned in the light path in a conjugated plane of the sample area. The device also com- (Continued)

prises a command of the spatial light modulator connected to the imaging device and adapted to measure the phase shift of a plurality of pixels of the phase image and to command the spatial light modulator in order to subtract the measured phase shifts.

9 Claims, 7 Drawing Sheets

(56) References Cited

U.S. PATENT DOCUMENTS

| | | | |
|---|---|---|---|
| 2016/0377423 | A1 | 12/2016 | Eilers et al. |
| 2019/0391378 | A1* | 12/2019 | Eichelkraut ............ G02B 21/36 |
| 2021/0208379 | A1* | 7/2021 | Abrantes Guedes Da Fonseca Pereira ............... G02B 21/0056 |
| 2022/0404769 | A1* | 12/2022 | Ideguchi .............. G03H 1/0443 |

OTHER PUBLICATIONS

F. Kenny et al.: "Adaptive optimisation of a generalised phase contrast beam shaping system", Optics Communications, vol. 342, May 1, 2015, pp. 109-114, XP055561920, Amsterdam, NL ISSN: 0030-4018, DOI: 10.1016/j.optcom.2014.12.059 p. 111-p. 113.
Tan H. Nguyen et al.: "Halo-free Phase Contrast Micropsy", Scientific Reports, vol. 7, No. 1, Mar. 24, 2017, XP055561926, DOI: 10.1038/srep44034 pp. 2,3.

* cited by examiner

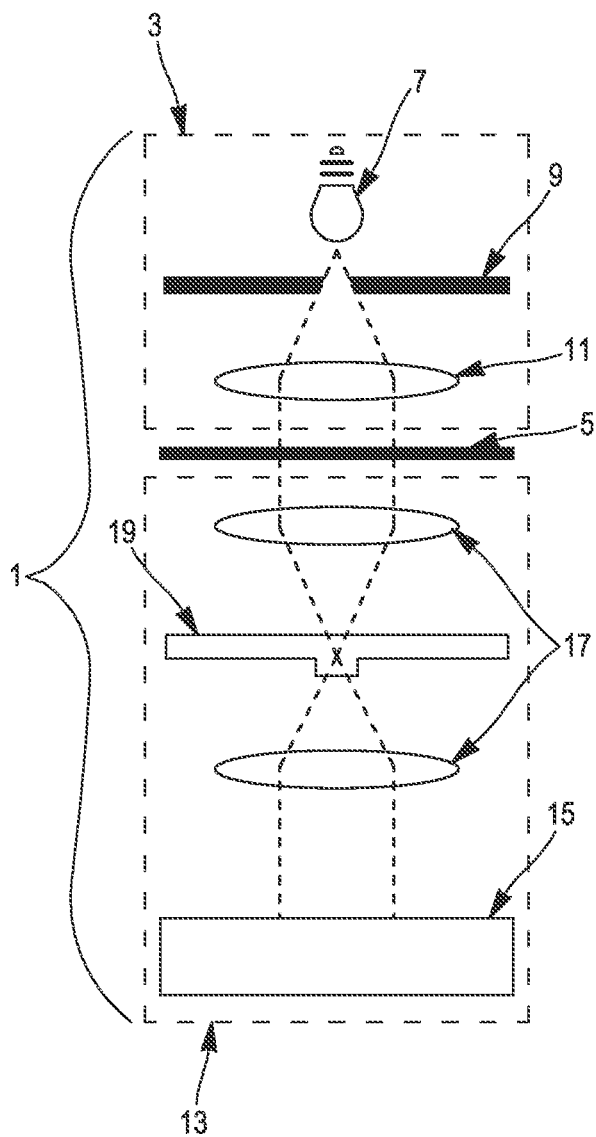
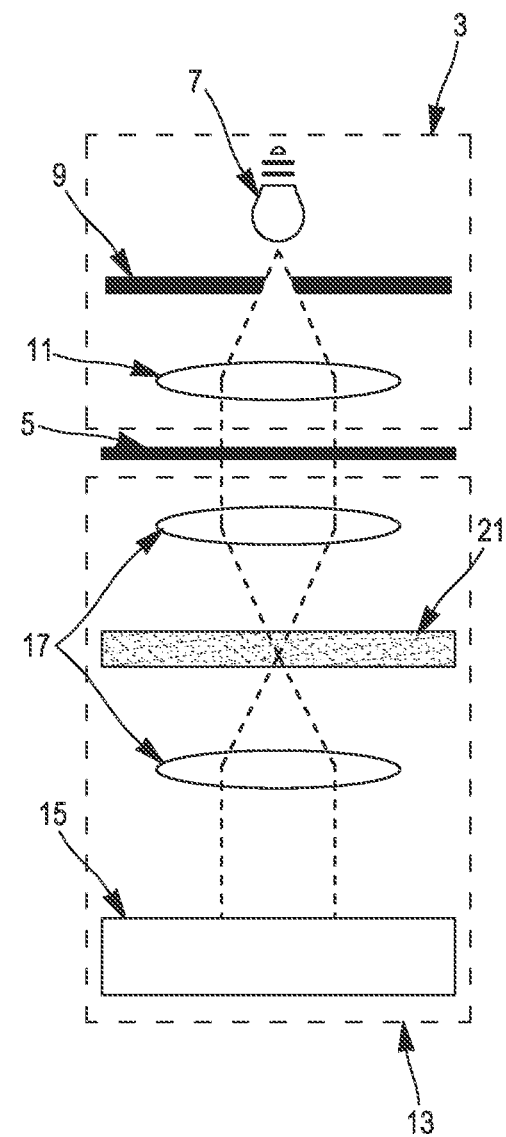
FIG. 1A
Prior Art
FIG. 1B
Prior Art

HIGH SENSITIVITY PHASE MICROSCOPY IMAGING

CROSS-REFERENCE TO RELATED APPLICATIONS

The present application is a filing under 35 U.S.C. 371 as the National Stage of International Application No. PCT/EP2019/073576, filed Sep. 4, 2019, entitled "HIGH SENSITIVITY PHASE MICROSCOPY IMAGING," which claims priority to European Application No. 18306171.2 filed with the European Intellectual Property Office on Sep. 5, 2018, both of which are incorporated herein by reference in their entirety for all purposes.

FIELD OF THE INVENTION

The present invention relates to phase microscopy and more particularly to phase microscopy for variable thickness samples.

BACKGROUND

The phase microscopy comprises many types of microscopy in which a signal wave is interfered with a reference wave in order to reveal information about the wavefront of the signal wave. Two prominent types of phase microscopy are: phase-contrast microscopy and spatial light interference microscopy, also known under the SLIM acronym.

Phase-contrast microscopy, also called Zernicke phase microscopy, is an optical microscopy technique that converts phase shifts in light passing through a transparent specimen to brightness changes in the image.

A phase microscope comprises a lighting device for illuminating a sample area. The lighting device comprises typically a light source and an optical element for concentrating the light onto the sample. The microscope further comprises an imaging device.

The imaging device comprises a camera, typically a 2D digital camera able to output a 2D matrix of pixels, some optical elements for directing the sample image onto the camera, i.e. the camera is at the conjugated plane of the sample. Other optical elements include lenses and a phase mask, typically a 90° phase shift ring installed on the light path between the sample area and the camera.

Consequently, in the phase microscope, the interference is generated between light rays passing through the sample and scattered by the sample, the scattered light, and light rays unaffected by the sample and forming the reference light.

SLIM is a highly sensitive quantitative phase imaging method, which is used to study structure in biology and beyond. SLIM combines phase contrast microscopy with a phase-stepping algorithm. Quantitative information about the phase shifts induced by the sample is retrieved by taking and evaluating multiple images with different phase-shifts applied to the reference wave.

Phase microscopy is an invaluable tool for the study of biological specimens such as cells, and has found both scientific and diagnostic applications. For flat samples the high sensitivity of phase microscopy allows for the detection of atomic steps on surfaces, and for the unlabeled detection of single proteins.

However, biological specimens have typically variable thicknesses which generates variable phase shifts. These spatial variations often cover the full range $(-\pi, \pi]$ and may even induce some phase wrapping. It is thus impossible to optimize the phase of a plane reference wave to achieve optimal sensitivity across the whole field of view.

SUMMARY

Consequently, it will be very helpful to restore optimal sensitivity across the whole field of view.

In a first embodiment, a device for phase microscopy comprises:
  a spatial light modulator, and
is characterized in that it further comprises:
  a connecting means adapted to fix the spatial light modulator onto a phase microscope, said phase microscope comprising a light path comprising at least a sample area, a lighting device for lighting said sample area and an imaging device for carrying out a step a) of capturing a phase image of said sample, said phase image being a 2D matrix of pixels, so that the spatial light modulator is positioned in the light path in a conjugated plane of the sample area, and
  a command of the spatial light modulator connected to the imaging device and adapted to:
    command a step b) of measuring the phase shift of a plurality of pixels of the phase image and
    command a step c) of commanding the spatial light modulator in order to substract the measured phase shifts.

Advantageously, the phase image is generated by an optical field E written as the sum of a plane reference wave $(E_R)$ and a scattered wave $(E_S)$: $E=|E|e^{i\Psi(x,y)}=|E_R|+|E_S(x,y)|e^{i\phi(x,y)}$, where:
  $\Psi(x,y)$ is the phase of the optical field E,
  $|E_R|$ is the field amplitude of the plane reference wave $E_R$,
  $\phi(x,y)$ is the phase of the scattered wave $E_S$,
  $|E_S|$ is the field amplitude of the scattered wave $E_S$, which yields to an intensity of the phase image: $I(x,y)=|E_S(x,y)|^2+|E_R|^2+2|E_S(x,y)||E_R|\cos(\phi(x,y)-\alpha)$ where $\alpha$ is chosen to be equal to $\pm\pi/2$.

Advantageously, in step c), the spatial light modulator (31) subtracts the measured phase-shift from the light ray associated with the pixel.

Advantageously, the command of the spatial light modulator is further adapted to command a repetition of the steps a) to c), recursively, and until $|\psi(x,y)-\psi_{meas}(x,y)|\ll 1$.

Advantageously, the absolute value of the difference $\psi(x,y)-\psi_{meas}(x,y)$ is less than $\pi/8$.

The criterion above helps improving the resolution of the phase image finally captured by the camera.

Advantageously, the device allows to cancel the image artifacts due to thickness variations of the sample.

Advantageously, once properly initialized, the device allows acquiring quantitative phase imaging in a single frame.

This embodiment comprises other features, alone or in combination, such as:
  the spatial light modulator is positioned between the lighting device and the sample area;
  the spatial light modulator is positioned between the sample area and the imaging device; and/or
  the command comprises
    at least one processor; and
    at least one memory including computer program code, the at least one memory and computer program code configured to, with the at least one processor, cause the performance of the device.

In a second embodiment, a phase microscope comprises a light path comprising at least a sample area, a lighting device for lighting said sample area and an imaging device for capturing a phase image of said sample, said phase image being a 2D matrix of pixels, and is characterized in that it further comprises a device as disclosed here above In a third embodiment, a method for obtaining a phase image of a sample by using a phase microscope as here above is characterized in that it comprises:

- capturing a first phase image of the sample with the spatial light modulator in a pass-through mode;
- measuring a phase shift of at least one pixel of the first phase image;
- controlling the spatial light modulator so that it subtracts the measured phase-shift from the light ray associated with the pixel.

This embodiment comprises other features, alone or in combination, such as:

- the step of capturing a first image is replaced by a step of acquiring a plurality of images that allow for a coarse estimate of the phase-shifts induced by the sample; and/or
- the steps are repeated recursively.

In a fourth embodiment, a digital data storage medium is encoding a machine-executable program of instructions to perform the method disclosed here above.

BRIEF DESCRIPTION OF THE FIGURES

Some embodiments of apparatus and/or methods in accordance with embodiments of the present invention are now described, by way of example only, and with reference to the accompanying drawings, in which :

FIGS. 1A and 1B schematically illustrate phase microscope of the prior art;

DESCRIPTION OF EMBODIMENTS

Figure 2:
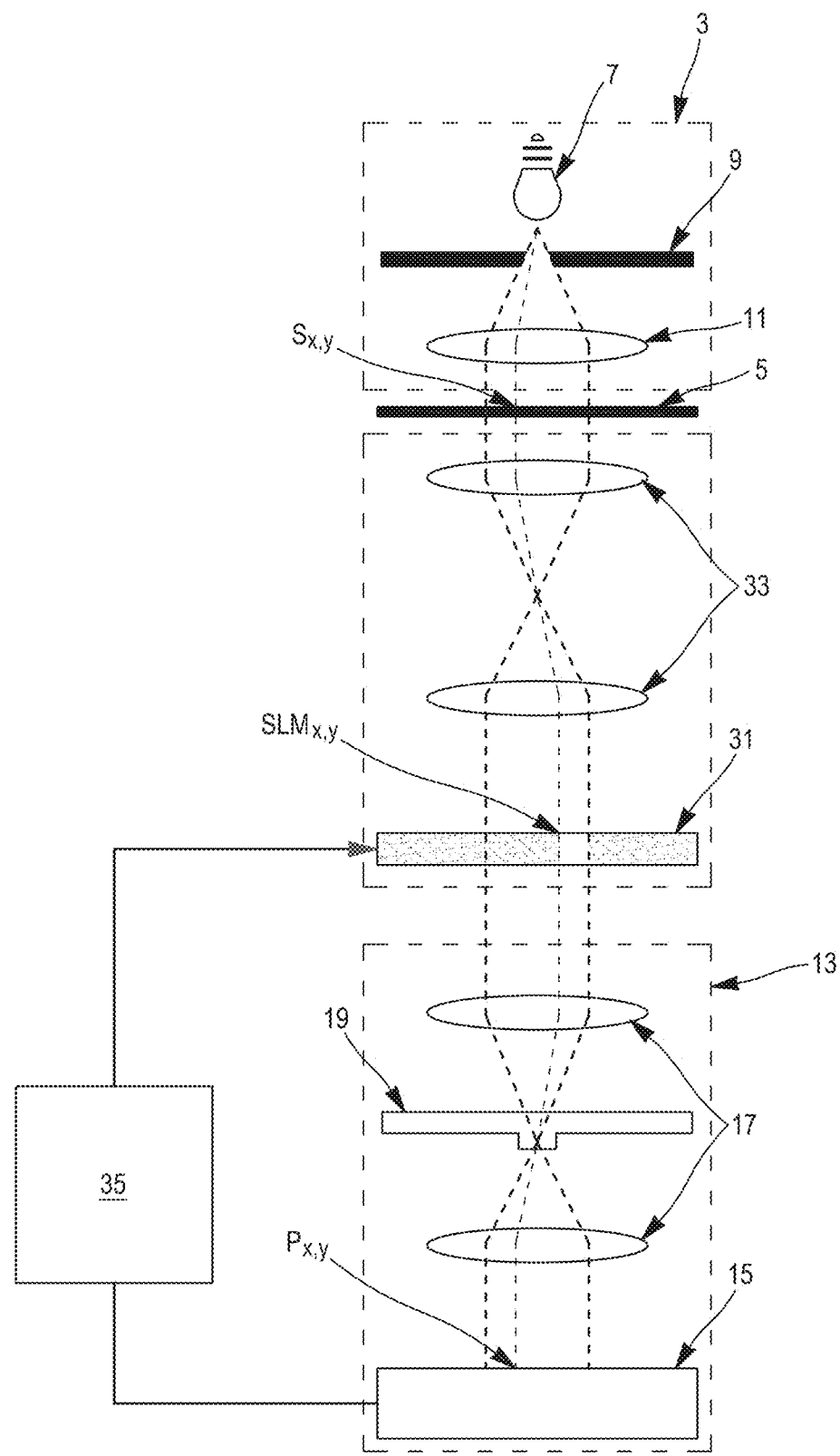
FIG. 2 schematically illustrates a first embodiment of the invention.

In all figures, references to same or similar elements are identical.

In reference to FIG. 1A and 1B, standard phase microscopes are schematically drawn.

In FIG. 1A, a phase-contrast microscope 1 comprises a lighting device 3 for illuminating a sample area 5.

The lighting device 3 comprises typically a light source 7, an amplitude mask 9, which can be a condenser annulus, and an optical element 11, or condenser, for concentrating the light onto the sample.

The microscope 1 comprises also an imaging device 13.

The imaging device 13 comprises a camera 15, typically a 2D digital camera able to output a 2D matrix of pixels, for capturing the resulting image of the sample.

The imaging device 13 comprises also optical elements 17, typically an objective and a tube lens, for directing the sample image onto the camera, i.e. the camera 15 is at the conjugated plane of the sample 5.

Finally, the imaging device 13 comprises a phase mask 19, typically a 90° phase shift ring installed on the light path between the sample area 5 and the camera 15.

FIG. 1B shows schematically a SLIM. The main difference with the phase-contrast microscope of FIG. 1A is that the phase mask 19 is replaced by a spatial light modulator 21. This spatial light modulator 21 allows stepping the phase of the reference wave, which in turn enables a quantitative retrieval of the phase shifts imprinted on the signal wave.

It is worthwhile to note that the phase mask 19 or the the spatial light modulator 21 are positioned in the Fourier plane of the sample plane 5, the camera 15, and the spatial light modulator 31. It therefore allows shifting the reference wave with respect to the signal wave, but it does not allow subtracting phaseshifts from the signal wave in a spatially resolved way.

FIG. 2 shows schematically a first embodiment based on the phase-contrast microscope of FIG. 1.

The light path of the microscope 1 is modified by inserting between the sample area 5 and the imaging device 13 a spatial light modulator 31.

Connecting means 33 fix the spatial light modulator onto the microscope 1, so that the spatial light modulator 31 is positioned in the light path in a conjugated plane of the sample area 5. Connecting means comprises mechanical elements and optical elements, such as lenses, to direct light through the light path.

In the embodiment of FIG. 2, compared to the microscope of FIG. 1A, the spatial light modulator 31 "replaces" the camera 15 at the conjugated plane of the sample area 5 and a new conjugated plane of the spatial light modulator 31 is created on which the camera 15 is positioned.

The spatial light modulator 31 is controlled by a command device 35 which is, for instance, a computer.

The command device 35 is connected to the imaging device 13, more particularly to the camera 15 in order to measure the phase shift of the pixels of the phase image.

The command device 35 commands then the spatial light modulator 31 in order to substract the measured phase shifts.

"Substracting the measured phase shifts" means that, for at least some regions, for instance for the light passing through the points $S_{x,y}$ of the sample 5, $SLM_{x,y}$ of the spatial light modulator 31 and captured as pixel $P_{x,y}$ by the camera 15, the phase shift measured at pixel $P_{x,y}$ is substracted from the wave-front at point $SLM_{x,y}$.

This operation may be applied for each pixel of the 2D matrix, for some pixels, for instance limited to the area of interest, and/or by grouping pixels in set of contiguous pixels defining basic areas for which an averaged phase shift is used.

In this last case, a compromise is done between the computer power and/or the speed of calculus on one side and the precision of the correction on the other side.

The substraction of phaseshifts from the signal wave, unlike prior art methods or systems, can be performed in a spatially resolved way. Indeed, as the spatial light modulator 31 is positioned at the conjugated plane of the sample area 5, the phase image captured by the camera 15 allows determining, by the command device 35, a complete map of phase-shifts across the whole field of view in the form of a 2D matrix of pixels. Based on this complete map of phase-shifts, the spatial light modulator 31 can be simply and directly configured by the command device 35 using the correspondences between the points $S_{x,y}$ of the sample 5, $SLM_{x,y}$ of the spatial light modulator 31 and captured at pixel $P_{x,y}$ of the camera 15.

This method is much simpler and more straightforward compared to methods in which a phase mask or a spatial light modulator used to modulate an input wavefront is positioned in the Fourier plane of a sample plane together with an imaging system. Indeed, with such methods, a pixel-to-pixel correspondence does not exist between the spatial light modulator and the 2D matrix of pixels of the phase image. The configuration of the spatial light modulator in those methods includes computations aiming at relating angular directions to pixels of the camera. In the present invention, such computations are not needed and a phase distribution of the spatial light modulator 31 is determined directly from the measured phase-shifts of the phase image. In particular, the phase distribution is easily determined in order to adjust locally the sensitivity of the system in a straight forward manner and as a consequence optimize the sensitivity of the system across the whole field of view.

To determine the phase of a signal wave $E_S=|E_S|e^{i\phi}$, it has to be interfered with a reference wave $E_R=|E_R|e^{i\alpha}$. The resulting interference pattern reads $I=|E_S|^2+|E_R|^2+2|E_S||E_R|\cos(\phi-\alpha)$, and its sensitivity to small changes of $\phi$ is proportional to $\sin(\phi-\alpha)$. For measurements at optimal sensitivity $\alpha$ needs to be adjusted such that $\phi-\alpha=(2n-1)\pi/2$, with $|n|=1,2,3,\ldots$. At $\phi-\alpha=n\pi$ the sensitivity drops to zero.

Phase contrast microscopy is based on the insight that the optical field after sample interaction can be written as the sum of a plane reference wave and a scattered wave $E=|E|e^{i\psi(x,y)}=|E_R|+|E_S(x,y)|e^{i\phi(x,y)}$. In the Fourier plane (after propagation through a 2f setup), the reference wave is focused onto a point, while the scattered wave is spread out across the plane, which allows adding a phase $\alpha$ to the reference wave, without significantly affecting the scattered wave. Propagation through another 2f setup yields an image of intensity:

$$I(x,y)=|E_S(x,y)|^2+|E_R|^2+2|E_S(x,y)||E_R|\cos(\phi(x,y)-\alpha) \quad (Eq1)$$

For $\alpha=\pm\pi/2$, the conventional schemes of positive and negative phase contrast are retrieved, which represent optimal choices only if $\phi(x,y)\approx0$.

The aim of the embodiment of FIG. 2 is to ensure this condition everywhere in the area of interest across the field of view of the image.

Figure 3:
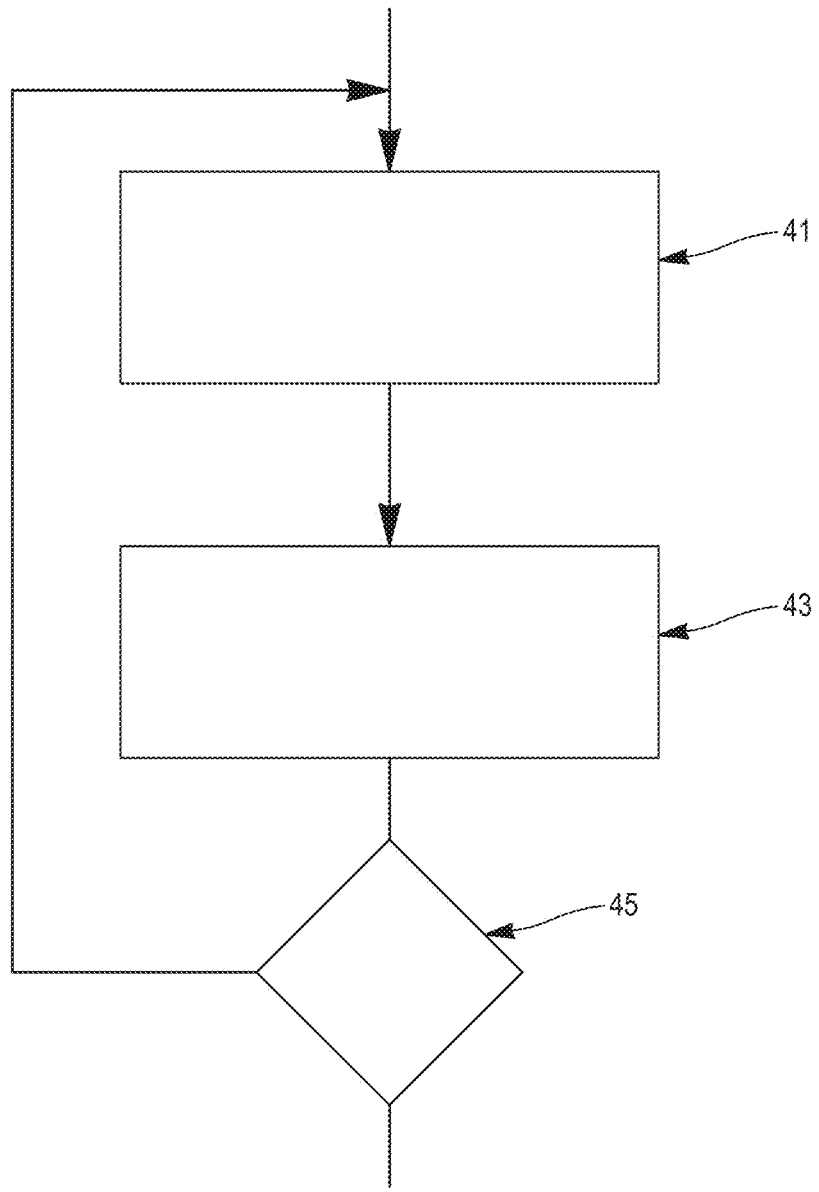
FIG. 3 schematically illustrates a workflow of a method to use the embodiment of FIG. 2.

Consequently, the method, FIG. 3, for using it is:

First, a phase image of the sample is taken, step 41, using the traditional quantitative phase imaging technique. At this step, the spatial light modulator 31 is initialized such that it does not alter the wave-front of the light.

Then, the spatial light modulator 31 is used to subtract the measured phase-shifts from the wave-front, step 43. The resulting phase variations, $\psi(x,y)-\psi_{meas}(x,y)$ are given by the error of the first measurement, which can be due to statistical or systematic errors (e.g. due to imaging artifacts such as halo effects commonly observed in phase microscopy).

If the error is non-negligible, step 45, the procedure can be applied iteratively until $|\psi(x,y)-\psi_{meas}(x,y)|\ll1$ across the field of view. For example, the procedure can be applied iteratively until the absolute value of the difference $\psi(x,y)-\psi_{meas}(x,y)$ is less than $\pi/8$. This criterion helps improving the resolution of the phase image finally captured by the camera 15. The choice of $\alpha=\pm\pi/2$ will now yield optimal sensitivity across the image. For dynamic studies this means that initialization of the spatial light modulator 31 at time $t_0$, will allow for optimal sensitivity at all following times $t_1>t_0$, if the phase mask displayed on the spatial light modulator 31 can be updated fast enough.

Figure 4:
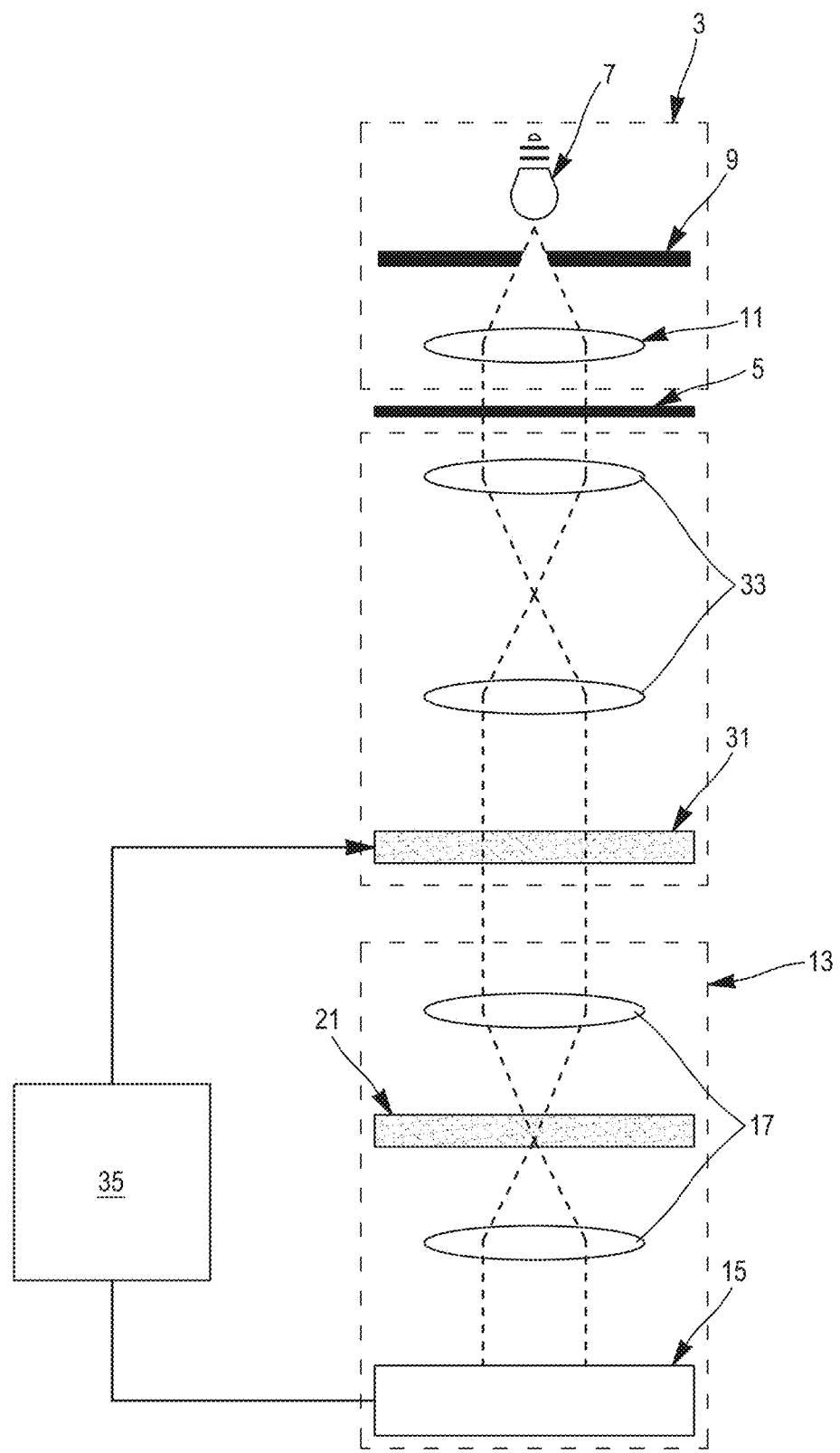
FIG. 4 schematically illustrates a second embodiment of the invention.

The step 41 of firstly capturing a sample image may be replaced by a step of acquiring a plurality of images that allow for a coarse estimate of the phase-shifts induced by the sample In a second embodiment shown on FIG. 4, the classical phase-contrast microscope 1 is replaced by the SLIM of FIG. 1B, i.e. the phase mask 19 is replaced by the spatial light modulator 21. The advantage of this embodiment is that SLIM can be used to get a first coarse estimate of the phase-shifts induced by the sample.

Figure 5:
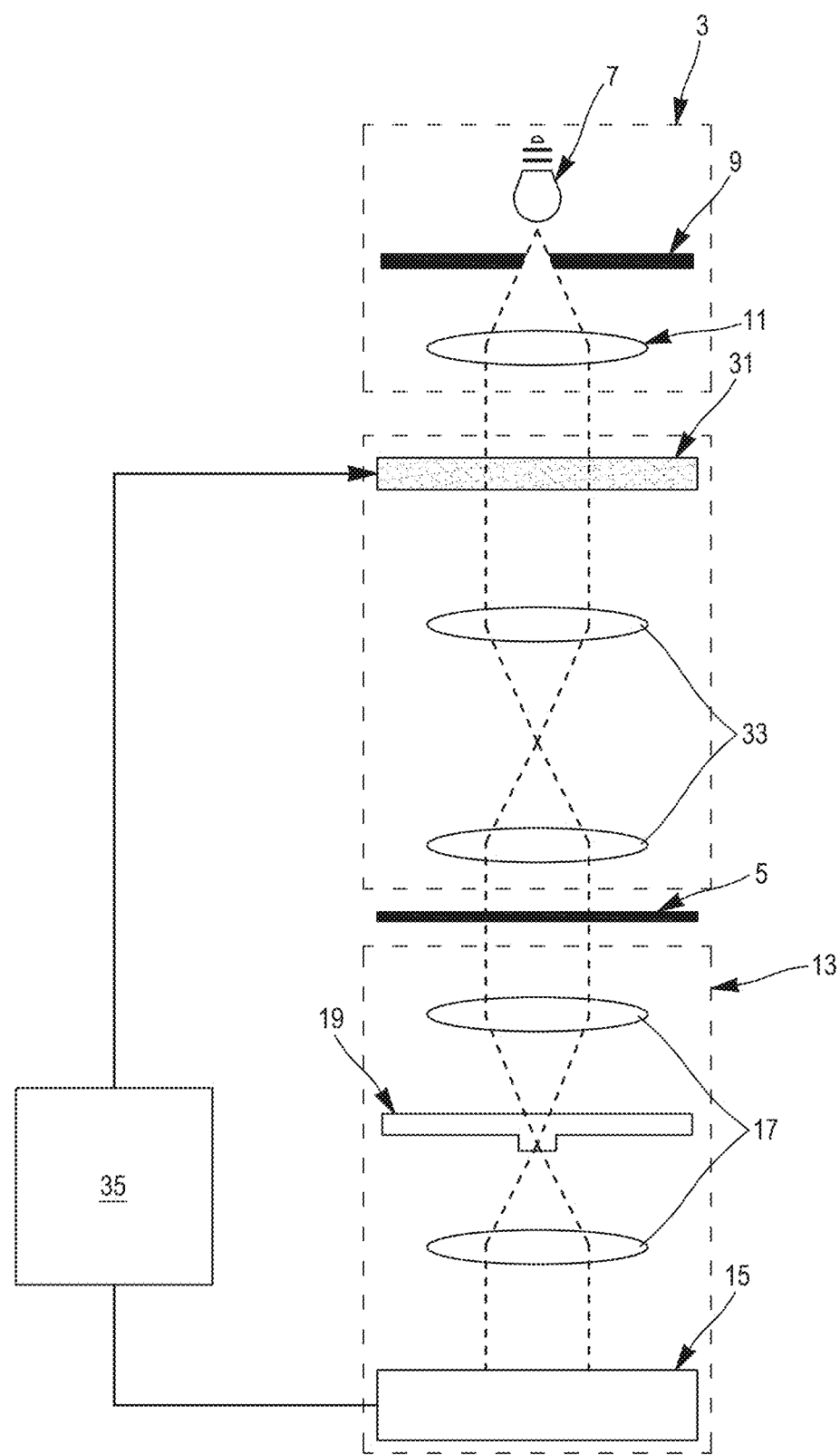
FIG. 5 schematically illustrates a third embodiment of the invention.

In a third embodiment, FIG. 5, the spatial light modulator 31 is still positioned in the conjugated plane of the sample but on the light path between the lighting device 3 and the sample area 5. This embodiment allows using commercial phase objectives, in which the phase mask is realized as integral part of the microscope objective.

Similarly, the optical elements 17 and those of the connecting means 33 may be reorganized in the best practical way. For instance, the tube lens may stay in position after the sample area 5 and the optical means are used to project the plane of the spatial light modulator 31 onto the camera 15.

The man skilled in the art notices that the FIGS. 1 to 4 show a spatial light modulator 31 of refracting mode, but a spatial light modulator of reflecting mode can also be used.

Figure 6:
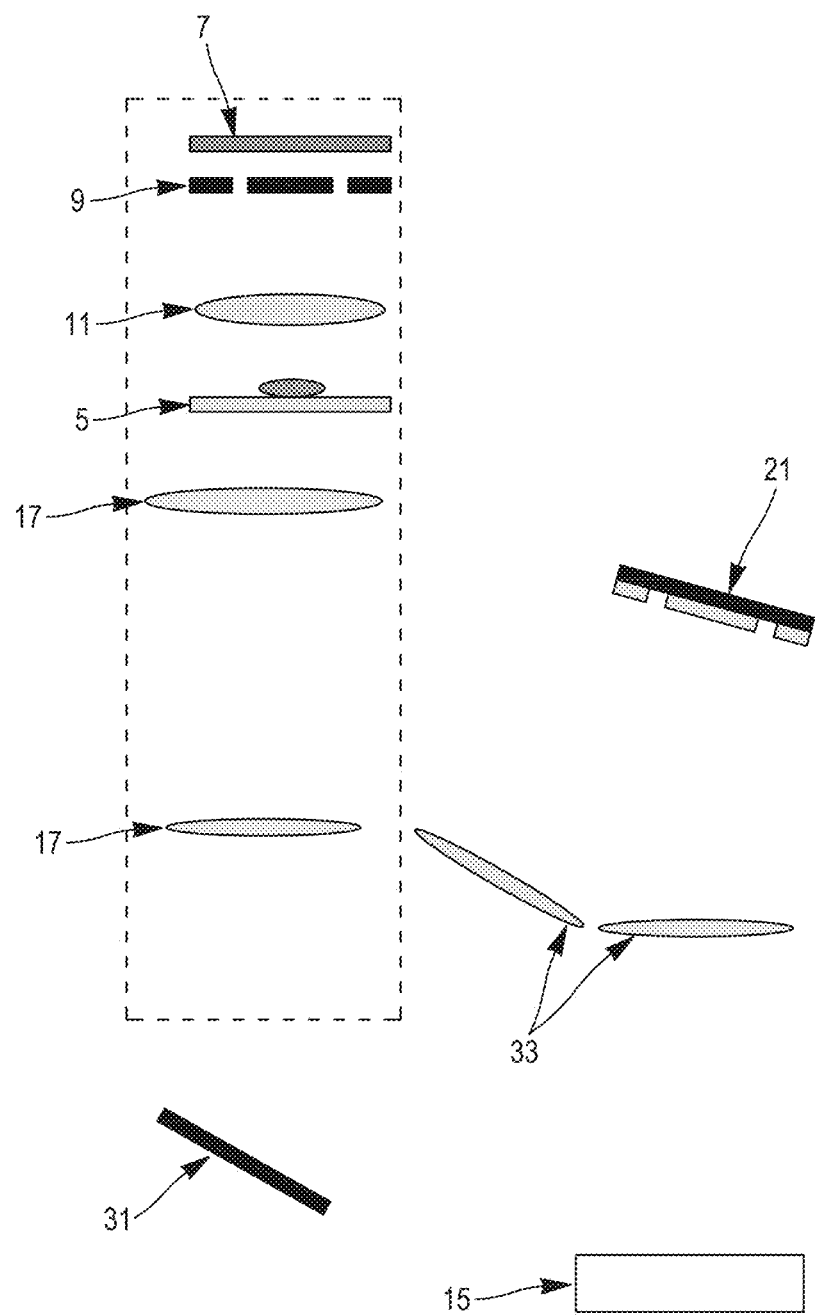
FIG. 6 schematically illustrates a fourth embodiment of the invention.

A setup using reflecting spatial light modulator with a SLIM is shown at FIG. 6.

It is built as an add-on to a commercial inverted microscope. The sample 5 is illuminated with light from an LED 7, and imaged onto a spatial light modulator 31 using a 50× (NA=0.75) objective. After reflection from the spatial light modulator 31, a 4f lens configuration is used to image the wave onto a camera 15. To perform phase microscopy, matched aperture and phase masks 9, 21 have to be inserted in conjugated planes before the sample 5 and after the spatial light modulator 31. These allow for selective application of $\alpha$ to the unscattered wave. While these masks are typically ring-shaped, a more random (but known) pattern is used here, which allows reducing imaging artifacts. The aperture mask 9 is laser printed, the phase mask 21 is realized using a spatial light modulator. A folded configuration can be used to allow for using two regions of a single spatial light modulator to realize the patterns required on spatial light modulator 31 and spatial light modulator 21.

Figure 7:
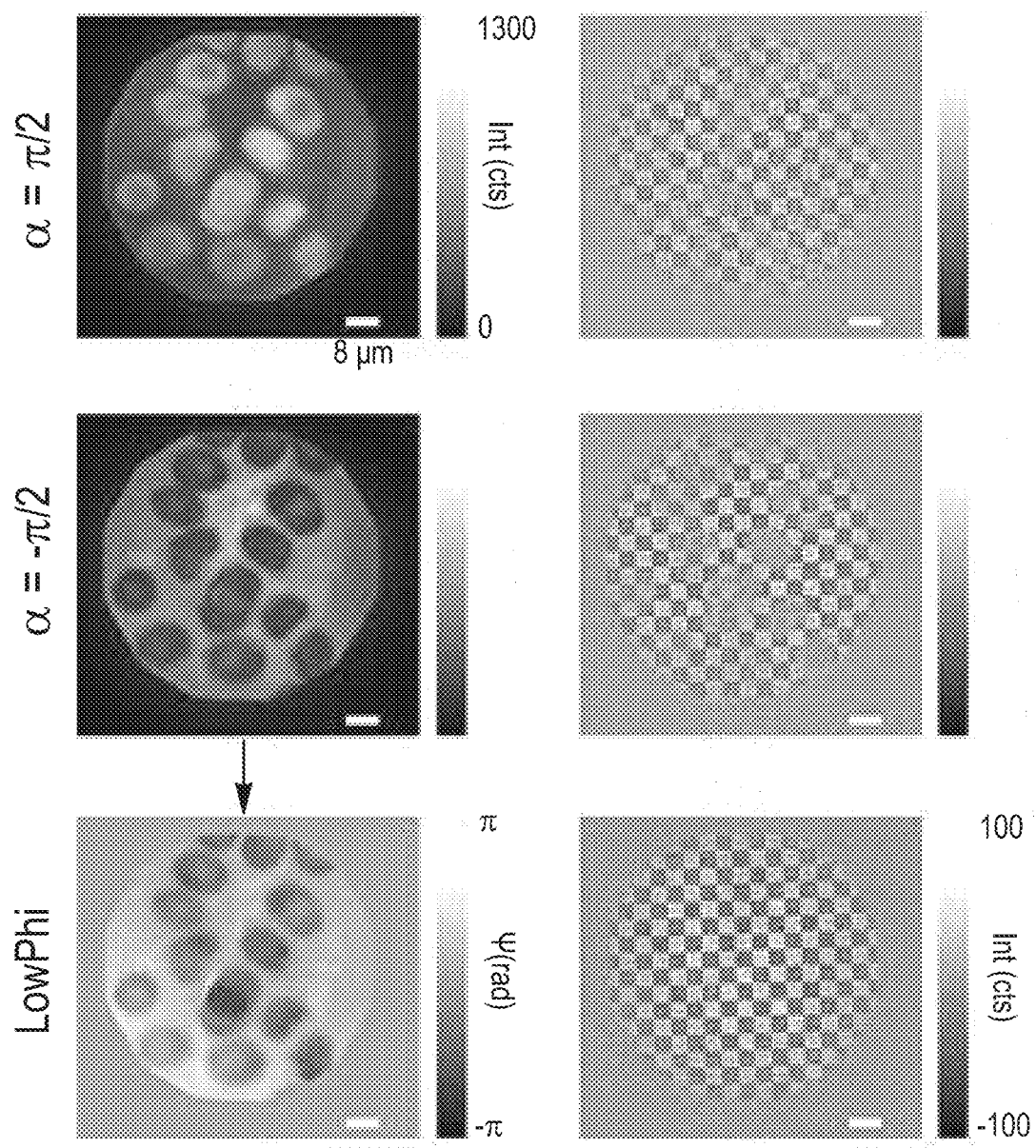
FIG. 7 schematically illustrates some resulting pictures obtained by the embodiment of FIG. 6.

To test the setup of FIG. 6 under real imaging conditions, biological samples are introduced in the sample plane of the inverted phase microscope. FIG. 7 shows the results obtained for red blood cells. Negative, positive, and corrected images are shown in the top row. The bottom row shows the results of a differential measurement, in which a checkerboard phase distribution has been added to the wavefront. FIG. 7 shows that the sensitivity to these additional phase shifts is improved by being more homogeneous, and quantitative when corrected by the phase-shift subtraction.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any routers shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. Device for phase microscopy comprising:
 a spatial light modulator;
 one or more elements adapted to fix the spatial light modulator onto a phase microscope, said phase microscope comprising a light path comprising at least a sample area, a first device configured to light said sample area and a second device configured to capture a phase image of said sample area, said phase image being a 2D matrix of pixels, so that the spatial light modulator is positioned in the light path in a conjugated plane of the sample area; and
 at least one processor of the spatial light modulator connected to the second device and adapted to:
  measure the phase shift of a plurality of pixels of the phase image and
  command the spatial light modulator in order to subtract the measured phase shift from light rays associated with the plurality of pixels.

2. Device according to claim 1, wherein:
 the phase image is generated by an optical field E written as the sum of a plane reference wave $E_R$ and a scattered wave $E_S$: $E=|E|e^{i\Psi(x,y)}=|E_R|+|E_S(x, y)|e^{i\phi(x,y)}$, where:
 $\Psi(x,y)$ is the phase of the optical field E,
 $|E_R|$ is the field amplitude of the plane reference wave $E_R$,
 $\phi(x,y)$ is the phase of the scattered wave $E_S$,
 $|E_S|$ is the field amplitude of the scattered wave $E_S$, which yields to an intensity of the phase image $I(x, y)=|E_S(x, y)|^2 +|E_R|^2+2|E_S(x, y)||E_R|\cos(\phi(x, y)-\alpha)$, where $\alpha$ is chosen to be equal to $\pm\pi/2$,
 the spatial light modulator subtracts the measured phase-shift from the light rays associated with the plurality of pixels,
 the at least one processor of the spatial light modulator is further adapted to command a repetition of capturing the phase image of said sample area, measuring the phase shift of the plurality of pixels of the phase image, and controlling the spatial light modulator in order to subtract the measured phase shifts, recursively, and until the absolute value of the difference $\psi(x, y)-\psi_{meas}(x, y)$ is less than $\pi/8$, where $\Psi_{meas}(x,y)$ is the measured phase shifts.

3. Device according to claim 1, characterized in that the spatial light modulator is positioned between the first device and the sample area.

4. Device according to claim 1, characterized in that the spatial light modulator is positioned between the sample area and the second device.

5. Device according to claim 1 wherein the at least one processor is a part of a computer, and wherein the computer further comprises:
 at least one memory including computer program code, the at least one memory and computer program code configured to cause the at least one processor to measure the phase shift of a plurality of pixels of the phase image and control the spatial light modulator in order to subtract the measured phase shifts.

6. Method for obtaining a phase image of a sample by using a phase microscope according to claim 1, characterized in that the method comprises:
 a step of capturing a first phase image of the sample with the spatial light modulator in a pass-through mode;
 a step of measuring a phase shift of at least one pixel of the first phase image;
 a step of controlling the spatial light modulator so that it subtracts the measured phase shift from the light rays associated with the plurality of pixels.

7. Method according to claim 6, characterized in that the step of capturing a first image is replaced by a step of acquiring a plurality of images that allow for an estimate of the phase shifts induced by the sample area.

8. Method according to claim 6, characterized in that the steps are repeated recursively.

9. A non-transitory computer readable medium encoding a machine-executable program of instructions to perform a method according to claim 6.

* * * * *